United States Patent
Lee

(10) Patent No.: US 9,460,121 B2
(45) Date of Patent: Oct. 4, 2016

(54) CONTACT CARD RECOGNITION SYSTEM AND RECOGNITION METHOD USING A TOUCH SCREEN

(71) Applicant: Byung Jin Lee, Seoul (KR)

(72) Inventor: Byung Jin Lee, Seoul (KR)

(*) Notice: Subject to any disclaimer, the term of this patent is extended or adjusted under 35 U.S.C. 154(b) by 0 days.

(21) Appl. No.: 13/863,361

(22) Filed: Apr. 15, 2013

(65) Prior Publication Data

US 2015/0021387 A1    Jan. 22, 2015

Related U.S. Application Data

(63) Continuation of application No. 13/002,503, filed as application No. PCT/KR2009/003446 on Jun. 25, 2009, now abandoned.

(30) Foreign Application Priority Data

Jul. 1, 2008  (KR) .................. 10-2008-0063528

(51) Int. Cl.
| | |
|---|---|
| *G06K 19/06* | (2006.01) |
| *G06F 17/30* | (2006.01) |
| *A63F 13/2145* | (2014.01) |
| *G06K 7/00* | (2006.01) |
| *G06K 19/067* | (2006.01) |

(52) U.S. Cl.
CPC ..... *G06F 17/30265* (2013.01); *A63F 13/2145* (2014.09); *G06K 7/0026* (2013.01); *G06K 19/06* (2013.01); *G06K 19/067* (2013.01); *G06K 2019/06271* (2013.01)

(58) Field of Classification Search
CPC .. G06K 17/00; G06K 19/0723; G06F 3/147; G09F 3/02; G05B 19/126
USPC ........ 235/375, 435, 439, 441, 451, 490, 492
See application file for complete search history.

(56) References Cited

U.S. PATENT DOCUMENTS

| | | | |
|---|---|---|---|
| 6,827,263 B2* | 12/2004 | Yap et al. | ...... 235/451 |
| 6,978,933 B2* | 12/2005 | Yap et al. | ...... 235/451 |
| 7,083,107 B2* | 8/2006 | Sakamoto et al. | ...... 235/492 |
| 7,156,302 B2* | 1/2007 | Yap et al. | ...... 235/382 |
| 2003/0023554 A1* | 1/2003 | Yap et al. | ...... 705/43 |
| 2004/0060988 A1* | 4/2004 | Sakamoto et al. | ...... 235/492 |
| 2005/0053907 A1 | 3/2005 | Liao | |
| 2009/0318229 A1* | 12/2009 | Zielinski et al. | ...... 463/37 |
| 2009/0322352 A1 | 12/2009 | Zachut et al. | |
| 2010/0012396 A1 | 1/2010 | Ogawa | |
| 2010/0276887 A1 | 11/2010 | Yoshida | |
| 2013/0069908 A1* | 3/2013 | Sung | ...... 345/174 |
| 2013/0334322 A1 | 12/2013 | Yoshida | |

FOREIGN PATENT DOCUMENTS

| | | |
|---|---|---|
| JP | 2005-78086 A | 3/2005 |
| JP | 2006-185338 A | 7/2006 |
| JP | 2007-11890 A | 1/2007 |
| JP | 3998701 B1 | 8/2007 |
| JP | 2008-161578 A | 7/2008 |
| KR | 2001-0066267 A | 7/2001 |
| KR | 10-2008-0050108 A | 6/2008 |
| WO | WO 2007/017848 A2 | 2/2007 |
| WO | WO 2008/050468 A1 | 5/2008 |

* cited by examiner

*Primary Examiner* — Paultep Savusdiphol
(74) *Attorney, Agent, or Firm* — IPLA P.A.; James E. Bame

(57) ABSTRACT

A contact card recognition system and a recognition method using a touch screen, and to a contact card used in a contact card recognition system.

7 Claims, 6 Drawing Sheets

CONTACT CARD RECOGNITION SYSTEM AND RECOGNITION METHOD USING A TOUCH SCREEN

RELATED APPLICATIONS

This application is a continuation of currently pending U.S. patent application Ser. No. 13/002,503 filed on Jan. 3, 2011, entitled CONTACT CARD RECOGNITION SYSTEM AND RECOGNITION METHOD USING A TOUCH SCREEN, which is a 371 application of International Application No. PCT/KR2009/003446, filed Jun. 25, 2009, which in turn claims priority from Korean Patent Application No. 10-2008-0063528, filed Jul. 1, 2008, each of which is incorporated herein by reference in its entirety.

TECHNICAL FIELD

The present invention relates to a contact card recognition system and a recognition method using a touch screen, in more detail, a contact card recognition system using a touch screen which includes a contact card having a back with at least one protrusion for identifying characteristics of the contact card, a touch screen generating position information of the protrusion of the contact card by sensing the protrusion, a reading unit searching a code data base on the basis of the position information and generating code information according to the position information, and a control unit searching a characteristic data base of the contact card on the basis of the code information and extracting characteristic information according to the code information, in which the characteristic information is outputted from the touch screen, and a recognition method using a touch screen.

BACKGROUND ART

A method of recording a barcode on a contact card and reading out the barcode with a barcode reader has been known in the related art, as a method that records information on a contact card and electronically reads out the information.

The method uses a way of printing a barcode with a specific identification code on a contact card and reading out the barcode with a barcode reader.

However, the method has a problem that a barcode reader is always needed, as well as the contact card with a barcode printed.

The barcode reader is expensive and cannot be mounted on personal game systems, such that the penetration is low.

Technical Problem

The present invention has been made in an effort to provide a contact card recognition system using a contact card which forms a protrusion representing characteristic information of a contact card on the back of the contact card, recognizes the protrusion on the back of the contact card, using a pressure sensitive touch screen, and outputs the recognized characteristic information on a screen, and a contact card recognition method.

Technical Solution

An embodiment of the present invention provides a contact card recognition system using a touch screen, which includes: a contact card having visual information formed on a front face thereof and at least one conductive material region formed on a rear face thereof, a position of the at least one conductive material region depending on the visual information; a touch screen to create position information by sensing the at least one conductive material region on the contact card when the contact card is in contact with the touch screen, the position information including at least one position on the touch screen corresponding to the position of the at least one conductive material region; and a control unit configured to search an information database for information corresponding to the position information and extract the searched information from the information database and enable the extracted information to be visually output on the touch screen, in which the information database includes a correspondence between the information to be searched for and the position information.

Preferably, the control unit may be configured to output question information and then compare the question information with the extracted information and enable a comparison result to be output.

The contact card recognition system using a touch screen may further include a sub-screen that outputs the extracted information and/or the comparison result, and the characteristic information.

The contact card recognition system using a touch screen may further include a reading unit, wherein the position information is encoded via the reading unit, and is sent to the control unit.

Another embodiment of the present invention provides a contact card recognition method using a touch screen, which includes: providing a contact card having visual information formed on a front face thereof and at least one conductive material region on the rear face thereof, a position of the at least one conductive material region on the rear face depending on the visual information; bringing the contact card into contact with a touch screen; creating, using the touch screen, position information by sensing the at least one conductive material region on the contact card, the position information including at least one position on the touch screen corresponding to the position of the at least one conductive material region; searching, using a control unit, an information database for information corresponding to the position information, wherein the information database includes a correspondence between the information to be searched for and the position information; extracting, using the control unit, the searched information from the information database; and enabling, using the control unit, the extracted information to be visually output on the touch screen.

Advantageous Effect

According to the present invention, it is possible to provide program using a contact card that makes it possible to execute interactive program, by using a contact card with a protrusion, the contact card with a protrusion, and program using the program.

Further, according to the present invention, it is possible to form a protrusion on the back of a contact card in order to identify a variety of characteristic information relating to print information recorded in the contact card by printing etc., read out the contact card with a touch screen, and output the characteristic information on the screen.

Further, according to the present invention, it is possible to provide a contact card with a protrusion including characteristics recorded by printing etc. in the contact card, and interactive program using the contact card.

Further, according to the present invention, it is possible to provide a visual effect implemented by combining an image on a screen and print information printed on a contact card by making a hole through the contact card or adjusting the transparency and color of a material, and provide program using the visual effect.

DETAILED DESCRIPTION OF THE PREFERRED EMBODIMENTS

Preferred embodiments of the present invention are described hereafter in detail with reference to the accompanying drawings.

Figure 1:
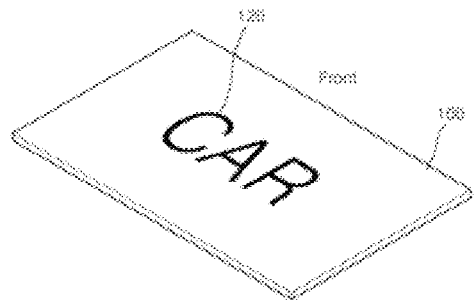
FIG. 1 is a view showing the front of a contact card according to an embodiment of the present invention.
Figure 2:
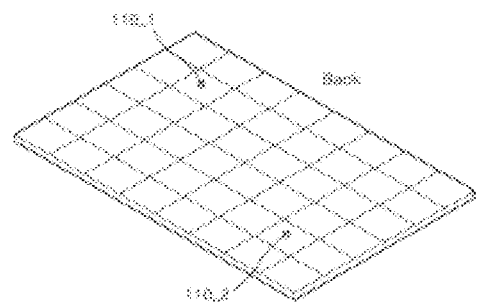
FIG. 2 is a view showing the back of the contact card according to an embodiment of the present invention.
Figure 3:
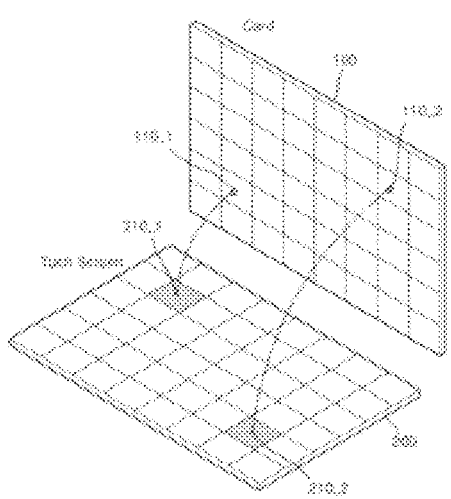
FIG. 3 is a view showing when the back of the contact card according to an embodiment of the present invention contacts with a touch screen.

FIG. 1 is a view showing the front of a contact card according to an embodiment of the present invention, FIG. 2 is a view showing the back of the contact card according to an embodiment of the present invention, FIG. 3 is a view showing when the back of the contact card according to an embodiment of the present invention contacts with a touch screen.

A contact card 100 according to the present invention may be used for executing an interactive game of an interactive study program, together with game machines and study devices, which are equipped with a touch screen, and may be used in various ways, such as an access card (a student identification card and an employee ID) which verifies the identification for entrance of a company or a school, or a card for authenticating qualifying software of a game machine or a computer equipped with a touch screen.

A variety of print information relating to characteristics of the contact card 100 is printed on the front of the contact card 100 according to an embodiment of the present invention and 'car' 120 representing a vehicle has been printed in FIG. 1.

A variety of print information relating to characteristics of the contact card 100, such as characters, symbols, and images (pictures), may be printed on the front of the contact card 100. For example, 'car' or 'Lion' may be printed as print information, as in FIG. 1, for infant English study program, the picture or the name of an employee or a student may be printed as print information for an employee ID or a student identification card, and the name of software that is authenticated may be printed for a card that authenticates qualifying software.

The contact card 100 according to an embodiment of the present invention has protrusions 110_1 and 110_2 in a protrusion zones corresponding to characteristic information, on the back, in order to represent characteristic information relating to the print information printed on the front of the contact card 100. The characteristic information implies information representing characteristics of the contact card, in connection with the print information printed on the front of the contact card 100.

For example, when a word 'vehicle' has been printed, as print information, on the contact card 100, for infant study program, the characteristic information may be an image (a picture or a video) representing a vehicle or 'car'. On the other hand, when sings representing a company name or an access card are printed as print information for an access card of a company, the characteristic information may be the name, the employee number, or access authority of the employee with the contact card. Further, for program authenticating qualifying software, the characteristic information may be an authentication code verifying the qualifying software. That it can be used for various recognition fields.

The characteristic information relating to the print information is formed in the protrusion on the back of the contact card 100 and a contact card recognition system that is described blow precisely recognizes the characteristic information of the contact card 100 by sensing the position of the protrusion.

The protrusion on the back of the contact card 100 may be formed various zones, for example, one of the zones shown by dotted lines in FIG. 2 or a plurality of zones. That is, the protrusions 110_1 and 110_2 on the back of the contact card 100 are formed in predetermined zones by the method that is determined in advance in accordance with the print information printed on the front of the contact card 100. The positions of the protrusions are different for the print information and the characteristic information relating to print information and the characteristic information of the contact card 100 depends on the positions of the protrusions. Meanwhile, the sizes of the zones where the protrusions are formed may be determined in various ways in accordance with the resolution that the touch screen can recognize and the recognition program.

For example, for two contact cards, protrusions are formed at the same position on two contact cards when the print information of the fronts of the two contact card 100 is the same, and the protrusions are formed at different positions on the two contact card when the print information of the fronts of the two contact cards 100 is different.

The protrusions 110_1 and 110_2 on the back of the contact card 100 are portions that allow the touch screen 200 to recognize a contact by contacting with the pressure sensitive touch screen 200. The protrusions 110_1 and 110_2 on the back of the contact card 100 contacts with the touch screen 200 and the pressure sensitive touch screen 200 that senses pressure can recognize the positions 210_1 and 210_2 that the protrusions contact, as coordinate information.

In this configuration, only one protrusion may be formed when the touch screen 200 recognizes a single touch and a plurality of protrusions may be formed when it can recognize a multi-touch.

Figure 4:
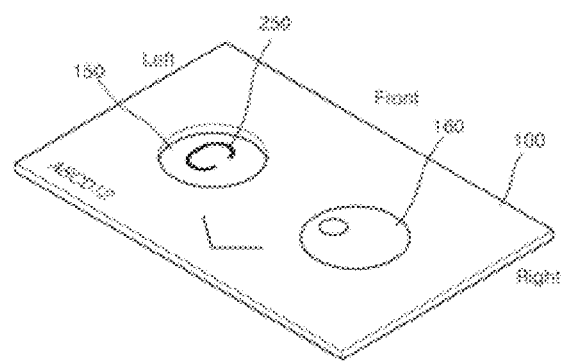
FIG. 4 is a view showing the front of a contact card according to another embodiment of the present invention.
Figure 5:
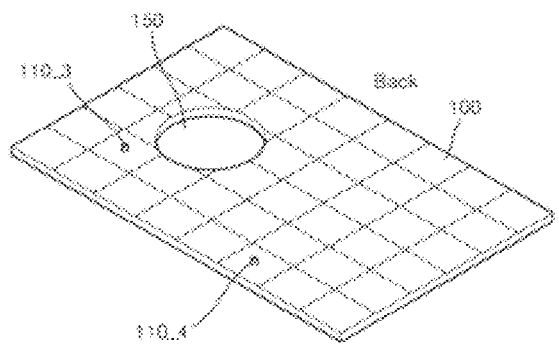
FIG. 5 is a view showing the back of a contact card according to another embodiment of the present invention.

FIG. 4 is a view showing the front of a contact card according to another embodiment of the present invention and FIG. 5 is a view showing the back of a contact card according to another embodiment of the present invention.

Print information representing, for example, an image, a character, and a symbol, is printed on the front of a contact card 100 according to another embodiment of the present invention and the contact card 100 may be formed of a transparent or a translucent material, having a hole 150.

Protrusions 110_3 and 110_4 for identifying characteristic information are formed on the back of the contact card 100, as described above, to represent the characteristic information relating to the print information on the front of the contact card. The protrusions 110_3 and 110_4 are formed at predetermined zone and the positions of the protrusions are determined in advance for the print information and the characteristic information.

When the contact card with the hole 150 is placed on a touch screen, an image 250 (including a picture and a video) outputted on the touch screen and a print image on the contact card 100 may be combined and implemented to provide various visual effects.

Figure 6:
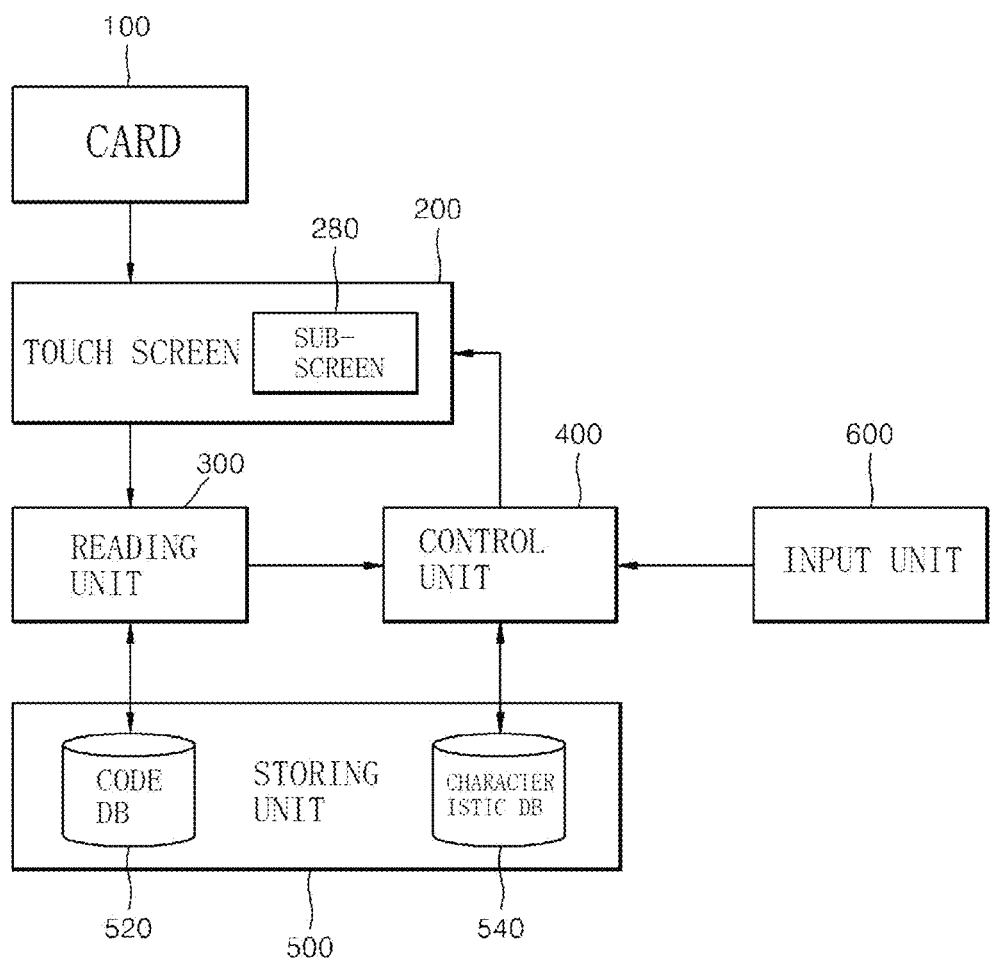
FIG. 6 is a block diagram of a contact card recognition system using a touch screen according to an embodiment of the present invention.

FIG. 6 is a block diagram of a contact card recognition system using a touch screen according to an embodiment of the present invention.

The contact card recognition system using a contact card according an embodiment of the present invention includes a contact card 100, a touch screen 200, a reading unit 300, a control unit 400, and a storage unit 500 storing a code database 520 and a characteristic database of the contact card, and may further include an input unit 600 or a sub-screen 280.

At least one protrusion for identifying the characteristic information is formed on the back to represent the characteristic information of the contact card relating to the print information printed on the front of the contact card 100.

When the contact card 100 with the protrusion is placed on the touch screen 200, the touch screen 200 senses the protrusion of the contact card, and creates and provides position information corresponding to the zone corresponding to the protrusion to the reading unit 300. The position information is information representing the position of the protrusion, that is the horizontal and vertical positions, on the contact card 100, and may be represented by position information with respect to a predetermine reference point. When a plurality of protrusions is formed, the position information includes information on the positions of all the protrusions.

The reading unit 300 searches the code database 520 on the basis of the position information of the protrusion and creates code information according to the position information of the protrusion of the contact card 100 from the code database 520. In this configuration, the code database 520 is a database storing code information corresponding to the position information of each of the protrusions.

The control unit 400 searches the characteristic database 540 of the contact card in accordance with the code information created from the reading unit 300 and extracts the characteristic information of the contact card according to the code information.

Further, the control unit 400 ascertains whether qualifying software is authenticated by using the extracted characteristic information, for example, and it may perform a control to allow a user to use the program when the software is authenticated, and prevent a user from using the software, when the software is not authenticated.

The characteristic database 540 is a database storing a variety of characteristic information of the contact card 100 for each of the code information. The code information varies in accordance with the position of the protrusion on the contact card and the characteristic information includes a variety of information representing the characteristics of the contact card, matching one-by-one with the code information.

For example, when a word 'vehicle' has been printed as print information, information, such as an image (a video or a picture) representing a vehicle and/or 'car' which is another English word for vehicle, is stored in the characteristic database, as characteristic information corresponding to the code information created from the contact card. Meanwhile, when the contact card is used as an access card, information, such as the name and the telephone number of the person with the contact card and/or whether access is allowed, may be stored for each of the code information in the characteristic database, and when the contact card is used as an authentication card of qualifying software, the characteristic information may be stored as an authentication code. Meanwhile, the characteristic information may be changed of renewed at the outside in accordance with the user conditions.

Further, the control unit 400 creates output information for outputting the extracted characteristic information to the touch screen or the sub-screen 280 and controls the reading unit 300, the storing unit 500, the input unit 600, the touch screen 200, and the sub-screen 280.

The extracted characteristic information is outputted by the touch screen 200 or the sub-screen 280.

The touch screen 200 is a pressure sensitive touch screen, as described above, which can output information while sensing pressure.

When the contact card 100 with a protrusion has a hole or is made of a transparent material, the characteristic information of the contact card may be outputted on the touch screen or in the touch screen zone corresponding to the hole of the contact card.

Meanwhile, the sub-screen 280 is a display device, that is, a display device that outputs the characteristic information and/or the result information of the contact card.

When the contact card 100 with a protrusion is placed on the touch screen and the contact card is made of an opaque material, it is difficult to recognize the characteristic information of the contact card 100, even if it is outputted through the touch screen 200. Therefore, when the contact card recognition system according to the present invention is made of an opaque material, it is preferable to further include the sub-screen 280 on which the characteristic information is outputted.

The contact card recognition system according to the present invention can perform an interactive game and may be operated to recognize and use the information in the contact card.

In order to perform the interactive game, the control unit 400 can create question information to be outputted to the touch screen 200 or the sub-screen 280. The game user watches the question information outputted on the touch screen 200 or the sub-screen 280 and then places the contact card printed with the answer corresponding to the question information, print information, on the touch screen 200.

The touch screen 200 created position information of the contact card, the reading unit 300 creates code information according to the position information of the contact card, and the control unit 400 creates characteristic information according to the code information.

The control unit 400 outputs the characteristic information according to the code information to the touch screen 200 and creates result information acquired by comparing the characteristic information according to the code information with the question information. The result information is information created by determining that the characteristic information of the contact card 100 placed on the touch screen 200 by the game user for the question information meets with the answer information for the question information. In this configuration, the question information and the answer information for the question information may be stored in the storing unit.

For example, when the sentence outputted as the question information is 'lion' and a card where a lion is drawn or a contact card printed with 'lion' is placed on the touch screen 200, result information 'correct' can be outputted.

The input unit 600 receives a key operation for operating a game from a game user, and receives various key operation signals and transmits them to the control unit 400, when the interactive study game is operated.

Meanwhile, the contact card recognition system according to the present invention may be implemented to recognize and use information in a contact card. For example, the contact card recognition system may be used for an access system by storing information on the name, phone number, position, and/or whether access is allowed in the characteristic information corresponding to the code information recognized from the contact card, recognizing the characteristic information according to the code information of the contact card used as an access card by using the control unit, and controlling access of the person with the access card in accordance with the recognized characteristic information. In this case, the question information may be an information sentence "contact the access card to the touch screen for access" and the result information may be information including the final result about the access is allowed after the contact card contacts to the touch screen and a corresponding control signal (e.g. a control signal for opening an automatic door when the access is allowed).

Further, the contact card recognition system according to the present invention may be used for a system that recognizes an authentication card for qualifying software by storing the authentication code that authenticate the qualifying software in the characteristic information corresponding to the code information recognized from the contact card, and recognizing the characteristic information according to the code information, and performing a control such that only the authenticated user uses the software in accordance with the recognized information, by using the control unit. In this case, the question information may be an information sentence "contact the authentication card to the touch screen to execute software first", and the result information may be information including the final result about whether the users is authenticated after the contact card contacts to the touch screen and a corresponding control signal (e.g. a control signal that allows the authenticated user to use the software).

Figure 7:
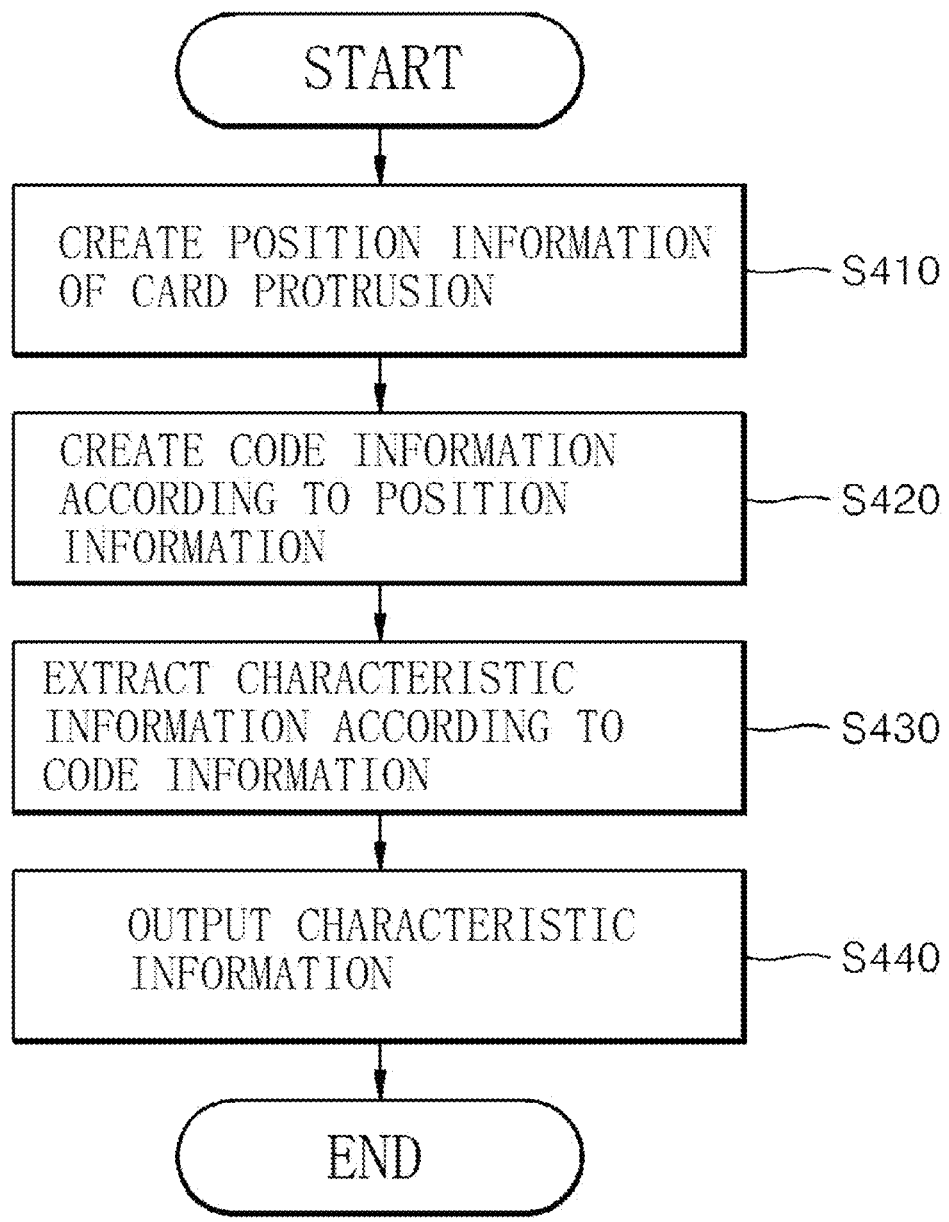
FIG. 7 is a flowchart illustrating a contact card recognition method using a touch screen according to an embodiment of the present invention.

FIG. 7 is a flowchart illustrating a contact card recognition method using a touch screen according to an embodiment of the present invention. The contact card recognition method using a contact card according to an embodiment of the present invention is a contact card recognition method that is performed by the contact card recognition system using a contact card, which has been described above, and repeated description is not provided.

A game user places first a contact card with a protrusion on the touch screen 200.

The protrusion of the contact card is formed in accordance with the characteristic information relating to the print information printed on the front of the contact card, that is, the protrusion is formed at a predetermined zone on the back of the contact card that is determined in advance for each characteristic of the contact card to identify the characteristics relating to the print information.

The touch screen 200 senses at least one protrusion on the back of the contact card and creates position information corresponding to the zone corresponding to the sensed protrusions (S410). When a plurality of protrusion is formed, the position information includes all information on the positions of the protrusions.

The reading unit 300 searches the code database on the basis of the position information and creates code information according to the position information (S420).

The control unit 400 searches the characteristic database of the contact card on the basis of the code information and extract characteristic information according to the code information (S430), and creates output information for outputting the extracted characteristic information.

The touch screen 200 or the sub-screen 280 outputs the characteristic information of the contact card on the touch screen 200 (S440).

Figure 8:
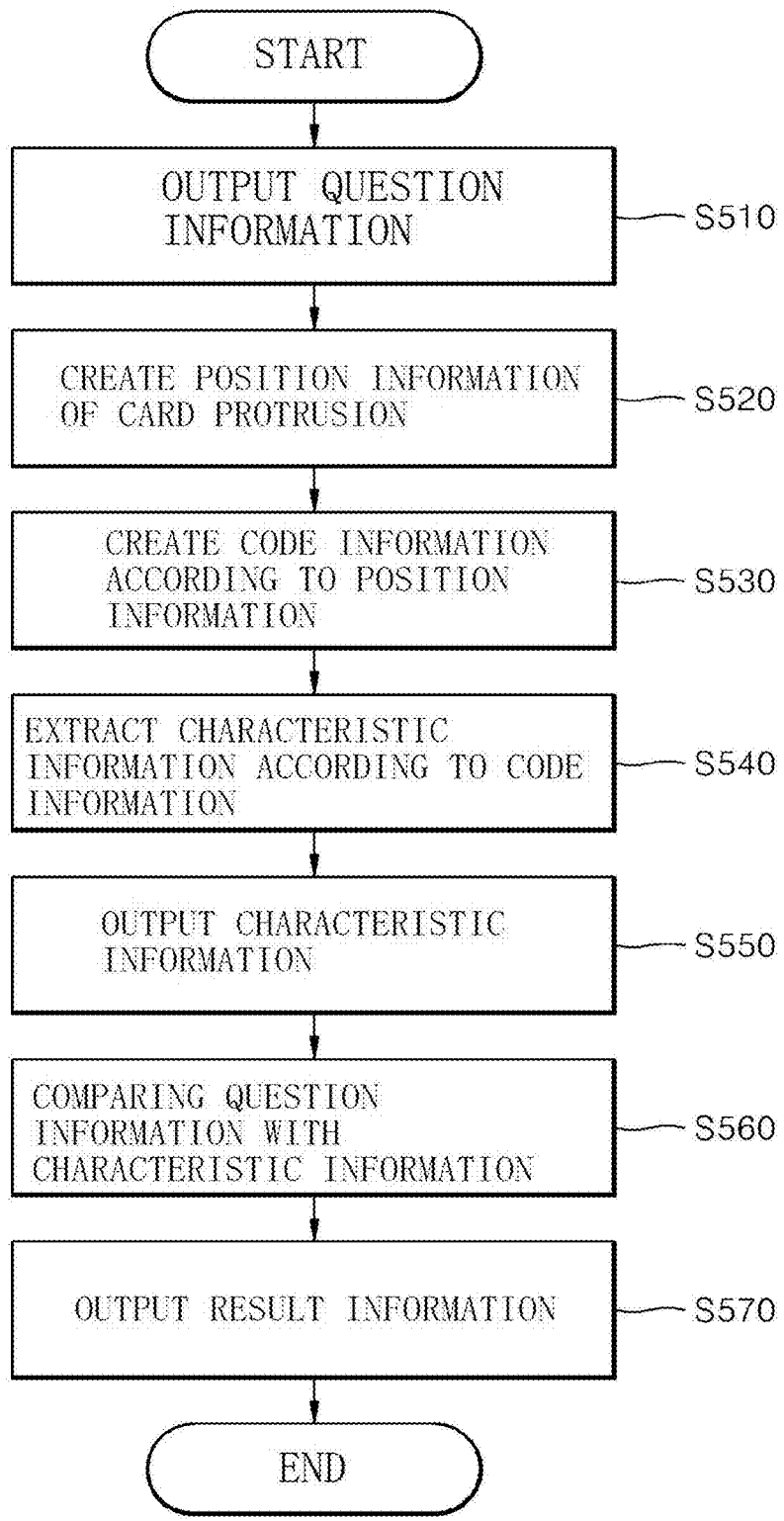
FIG. 8 is a flowchart illustrating a contact card recognition method using a touch screen according to another embodiment of the present invention.

FIG. 8 is a flowchart illustrating a contact card recognition method using a touch screen according to another embodiment of the present invention.

The touch screen 200 or the sub-screen 280 outputs first question information (S510). The question information is information on a question selected by the control unit, for example, may be information proposed as a problem to the game user to operate the game or an information sentence for access.

The game user watches the question information outputted on the touch screen 200 or the sub-screen 280 and then may select a contact card printed with information on the front which is estimated as the correct answer for the question information and place the contact card on the touch screen 200, or may place a contact card on the touch screen 200 in accordance with the information sentence.

The touch screen 200 senses at least one protrusion on the back of the contact card and creates position information corresponding to the zone corresponding to the protrusion (S520). When a plurality of protrusions is formed, the position information includes information on all the positions of the protrusions.

The reading unit 300 searches the code database on the basis of the position information and creates code information according to the position information (S530).

The control unit 400 searches the characteristic database of the contact card on the basis of the code information and extracts characteristic information according to the code information (S540), and creates output information for outputting the extracted characteristic information.

The touch screen 200 or the sub-screen 280 outputs the characteristic information of the contact card on the touch screen 200 (S550).

The control unit 400 creates result information acquired by comparing the extracted characteristic information of the contact card with the question information.

When the system is used for game, the control unit 400 determines whether the extracted characteristic information meets with the correct answer information for the question information, and creates result information acquired by determining whether the contact card selected and placed on the touch screen 200 by the game user meets with the correct answer information. The result information includes information on whether the contact card placed on the touch screen 200 by the game user, corresponding to the question information, meets with the correct answer or not.

Further, for example, when the system is used for an access system and the extracted characteristic information includes access-allowable information, result information that allows access may be created.

Figure 9:
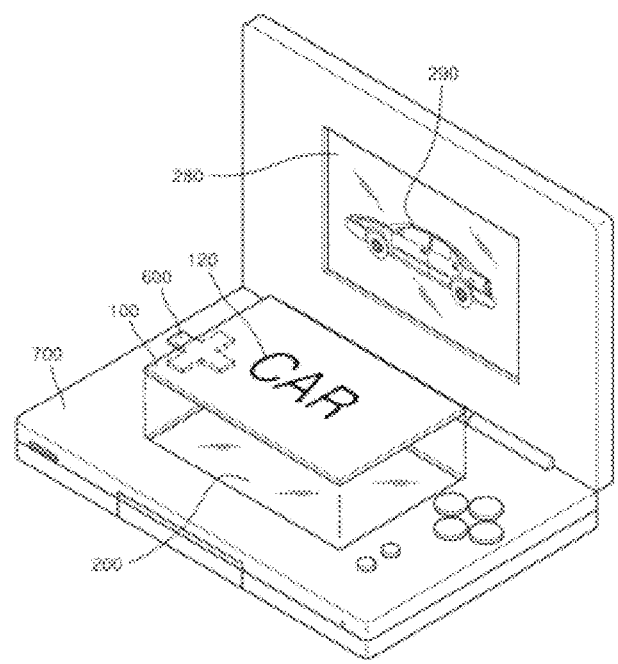
FIG. 9 is a view showing a contact card recognition system according to an embodiment of the present invention.

FIG. 9 is a view showing a contact card recognition system according to an embodiment of the present invention.

Referring to FIG. 9, a contact card recognition system 700 including a screen 200, a sub-screen 280, and an input unit 600 for operating keys is exemplified.

Print information 120, an English word 'car' has been printed on the front of a contact card 100 and a protrusion for identifying characteristic information corresponding to 'car' has been formed at a predetermined zone on the back.

According to the present invention, when the contact card 100 is placed on the touch screen 200, a vehicle-shaped image corresponding to 'car' may be outputted as characteristic information on the sub-screen 280. Obviously, Korean character information '자동차' may be outputted, instead of the image.

Meanwhile, the image of the vehicle outputted on the sub-screen 280 may be outputted as question information. The contact card 100 printed with print information of 'car' 120 is placed on the touch screen 200, the contact card (car) placed on the touch screen, for the question information (vehicle) is the correct answer, such that result information showing that the answer for the question is correct may be outputted on the sub-screen.

Figure 10:
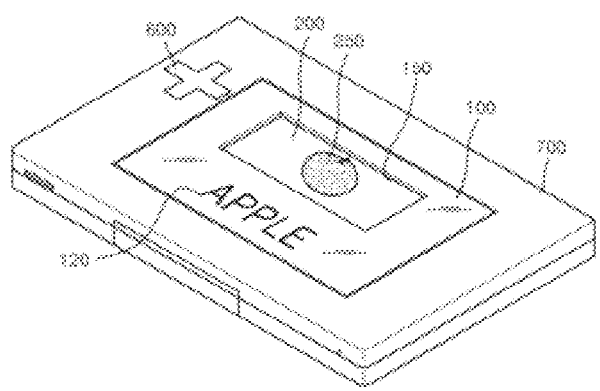
FIG. 10 is a view showing a contact card recognition system according to another embodiment of the present invention.

FIG. 10 is a view showing a contact card recognition system according to another embodiment of the present invention. When the contact card printed with print information 120 is transparent or has a hole 150, as in FIG. 9, the contact card recognition system 700 according to the present invention can be implemented by one touch screen 200.

Print information 120 of an English word 'APPLE' has been printed on the front of the contact card 100 and a protrusion for identifying characteristic information corresponding to 'APPLE' has been formed at a predetermined zone on the back of the contact card 100.

According to the present invention, when the contact card 100 is placed on the touch screen 200, an apple-shaped image 250 corresponding to 'APPLE' may be outputted on the touch screen 200. Meanwhile, the apple image 250 outputted on the touch screen 200 may be outputted as question information. When the contact card 100 printed with print information of 'APPLE' 120 is selected and placed on the touch screen 200 by a game user after the question information is outputted, the contact card (APPLE) placed on the touch screen, for the question information (apple) is the correct answer, such that result information saying that the answer for the question is correct may be outputted on the sub-screen.

The contact card, the contact card recognition system using a touch screen, and a contact card recognition method using a touch screen, according to the present invention, may be used in various field, such as a game, an interactive game, a study device, study program, individual information recognition (student identification card and employee card), access card system, and authentication of game program. The number of the zones where protrusions are formed on the back of the contact card and the number of the protrusions may be increased and the number of corresponding code information may be increased, such that the numbers are not limited to the embodiments described herein and the system may be used in various ways for recognizing code information of cards and corresponding characteristic information.

The method may be implemented by a computer-readable code on a computer-readable recording medium. The computer-readable recording medium includes all of recording devices that store computer-readable data. For example, the computer-readable recording medium may be ROM, RAM, CD-ROM, a magnetic tape, and an optical data storage device, and also includes device implemented by carrier wave (e.g. internet transmission). Further, the computer-readable recording medium may be distributed in computer systems connected by network and computer-readable codes may be stored and executed by a distribution method.

Although the present invention exemplifies a pressure sensitive touch screen, that is, a pressure-resistant type of touch screen, the touch screen may be various other touch screens, such as capacitive overlay type or electronic-induction type of touch screens.

However, when a capacitive overlay type of touch screen is used, the front of the contact card 100 is made of or coated with a conductive material, such as metal, and the back is made of non-conductive material. In this case, the protrusion is made of a conductive material, such as metal, and connected to the front made of a conductive material, protruding from the back.

Further, when the electronic-induction type of touch screen is used, a coil generating a magnetic field is disposed in the protrusion on the back of the contact card 100.

The capacitive overlay type of touch screen and the electronic-induction type of touch screen have been well known in the art, such that the detailed description is not provided.

It will be apparent to those skilled in the art that the scope of the present invention that have been described above is not limited to the embodiments described above and may be changed and modified in various ways, without departing from the spirit of the present invention. Therefore, the changes and modifications should be construed as being included in the scope of the present invention described in claims.

What is claimed is:

1. A contact card recognition system using a touch screen, comprising:
   a contact card having visual information formed on a front face thereof and at least one conductive material region formed on a rear face thereof, a position of the at least one conductive material region depending on the visual information;
   a touch screen to create position information by sensing the at least one conductive material region on the contact card when the contact card is in contact with the touch screen, the position information including at least one position on the touch screen corresponding to the position of the at least one conductive material region; and
   a control unit configured to search an information database for information corresponding to the position information and extract the searched information from the information database and enable the extracted information to be visually output on the touch screen,
   wherein the information database includes a correspondence between the information to be searched for and the position information.

2. The contact card recognition system using a touch screen according to claim 1, wherein the control unit is configured to output question information and then compare the question information with the extracted information and enable a comparison result to be output.

3. The contact card recognition system using a touch screen according to claim 2, further comprising a sub-screen that outputs the extracted information and/or the comparison result, and the characteristic information.

4. The system of claim 1, further comprising a reading unit, wherein the position information is encoded via the reading unit, and is sent to the control unit.

5. A contact card recognition method using a touch screen, comprising:
prov018ing a contact card having visual information formed on a front face thereof and at least one conductive material region on the rear face thereof, a position of the at least one conductive material region on the rear face depending on the visual information;
bringing the contact card into contact with a touch screen;
creating, using the touch screen, position information by sensing the at least one conductive material region on the contact card, the position information including at least one position on the touch screen corresponding to the position of the at least one conductive material region;
searching, using a control unit, an information database for information corresponding to the position information, wherein the information database includes a correspondence between the information to be searched for and the position information;
extracting, using the control unit, the searched information from the information database; and
enabling, using the control unit, the extracted information to be visually output on the touch screen.

6. The method according to claim 5, further comprising encoding the position information by a reading unit and sending the encoded information to the control unit.

7. The method of claim 5, further comprising outputting, using the control unit, question information and then comparing the question information with the extracted information and enabling a comparison result to be output.

* * * * *